US012587922B2

(12) United States Patent
Zheng et al.

(10) Patent No.: US 12,587,922 B2
(45) Date of Patent: Mar. 24, 2026

(54) MEASUREMENT CONFIGURATION DURING UPLINK DATA TRANSFER OVER RANDOM ACCESS OR DEDICATED UPLINK RESOURCES

(71) Applicant: QUALCOMM Incorporated, San Diego, CA (US)

(72) Inventors: Ruiming Zheng, Beijing (CN); Ozcan Ozturk, San Diego, CA (US); Masato Kitazoe, Hachiouji (JP); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 18/040,275

(22) PCT Filed: Aug. 21, 2020

(86) PCT No.: PCT/CN2020/110445
§ 371 (c)(1),
(2) Date: Feb. 2, 2023

(87) PCT Pub. No.: WO2022/036671
PCT Pub. Date: Feb. 24, 2022

(65) Prior Publication Data
US 2023/0362765 A1 Nov. 9, 2023

(51) Int. Cl.
*H04W 36/00* (2009.01)

(52) U.S. Cl.
CPC .............................. *H04W 36/0088* (2013.01)

(58) Field of Classification Search
CPC .......................... H04W 36/0088; H04W 76/27
See application file for complete search history.

(56) References Cited

U.S. PATENT DOCUMENTS

| 10,327,265 | B2 | 6/2019 | Ly et al. | |
| 2009/0239533 | A1* | 9/2009 | Somasundaram | .... H04W 48/16 |
| | | | | 455/434 |

(Continued)

FOREIGN PATENT DOCUMENTS

| CN | 110856276 A | 2/2020 |
| CN | 111556521 A | 8/2020 |

(Continued)

OTHER PUBLICATIONS

OPPO: "Discussion on Data Transmission in Inactive" State, 3GPP TSG-RAN WG2 Meeting #96, R2-167479, 3rd Generation Partnership Project, Mobile Competence Centre, 650, Route Des Lucioles, F-06921 Sophia-Antipolis Cedex, France, vol. RAN WG2, No. Reno, USA, Nov. 14, 2016-Nov. 18, 2016, Nov. 13, 2016, 5 Pages, XP051177395.

(Continued)

*Primary Examiner* — Barry W Taylor
(74) *Attorney, Agent, or Firm* — Harrity & Harrity, LLP

(57) ABSTRACT

Various aspects of the present disclosure generally relate to wireless communication. In some aspects, a user equipment (UE) may determine, in an inactive state, that uplink data is to be transmitted. The UE may determine a measurement gap configuration for a cell reselection procedure to be performed during a transmission of the uplink data in the inactive state. The UE may perform the cell reselection procedure in accordance with the measurement gap configuration. Numerous other aspects are provided.

29 Claims, 13 Drawing Sheets

900 ⟶

(56)                References Cited

U.S. PATENT DOCUMENTS

| | | | |
|---|---|---|---|
| 2014/0146907 A1 | 5/2014 | Kim et al. | |
| 2016/0073306 A1 | 3/2016 | Yang et al. | |
| 2016/0212642 A1 | 7/2016 | Ljung et al. | |
| 2018/0343659 A1 | 11/2018 | Hahn et al. | |
| 2020/0107396 A1* | 4/2020 | Wang | H04W 88/023 |
| 2020/0137602 A1 | 4/2020 | Zhang et al. | |
| 2022/0007286 A1* | 1/2022 | Ciftcioglu | H04W 76/28 |
| 2023/0120407 A1* | 4/2023 | Huang | H04W 76/19 |
| | | | 370/329 |
| 2023/0199680 A1* | 6/2023 | Leng | G01S 19/25 |
| | | | 370/503 |
| 2024/0015686 A1* | 1/2024 | Rao | H04W 64/00 |

FOREIGN PATENT DOCUMENTS

| | | | |
|---|---|---|---|
| WO | 2018084995 | | 5/2018 |
| WO | 2020034901 | A1 | 2/2020 |
| WO | WO-2020122617 | A1 | 6/2020 |

OTHER PUBLICATIONS

Supplementary European Search Report—EP20949881—Search Authority—Munich—Apr. 22, 2024.
International Search Report and Written Opinion—PCT/CN2020/110445—ISA/EPO—May 20, 2021.
ZTE Corporation, et al., "Details of RRC-Based IDT", 3GPP TSG-RAN2#111e, R2-2007449, Aug. 17, 2020-Aug. 28, 2020, 18 Pages, Aug. 6, 2020 (Aug. 6, 2020) the whole document.

* cited by examiner

700

Base Station 110

UE 120

710: RACH msg1

720: RACH msg2

730: RRC Resume Request + CUR Request MAC CE over RACH msg3

740: RRC Release, CUR configuration over RACH msg4

760: UL Data on CUR

770: Subsequent UL Data on CUR

750 UE monitors CUR USS

1010 Determine, in an inactive state, that uplink data is to be transmitted

1020 Determine a measurement gap configuration for a cell reselection procedure to be performed during a transmission of the uplink data in the inactive state 1030 Perform the cell reselection procedure in accordance with the measurement gap configuration

1000

1110 — Receive, from a user equipment (UE), an indication that uplink data is to be transmitted while the UE is in an inactive state 1120 — Transmit, to the UE, a measurement gap configuration for a cell reselection procedure to be performed by the UE during a transmission of the uplink data in the inactive state

1100

MEASUREMENT CONFIGURATION DURING UPLINK DATA TRANSFER OVER RANDOM ACCESS OR DEDICATED UPLINK RESOURCES

CROSS-REFERENCE TO RELATED APPLICATION

This application is a 371 national stage of Patent Cooperation Treaty (PCT) Application No. PCT/CN2020/110445, filed on Aug. 21, 2020, entitled "MEASUREMENT CONFIGURATION DURING UPLINK DATA TRANSFER OVER RANDOM ACCESS OR DEDICATED UPLINK RESOURCES," which is hereby expressly incorporated by reference herein.

FIELD OF THE DISCLOSURE

Aspects of the present disclosure relate generally to wireless communication and more specifically to techniques and apparatuses for measurement configuration during uplink data transfer over random access or dedicated uplink resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining, in an inactive state, that uplink data is to be transmitted; determining a measurement gap configuration for a cell reselection procedure to be performed during a transmission of the uplink data in the inactive state; and performing the cell reselection procedure in accordance with the measurement gap configuration.

In some aspects, a method of wireless communication performed by a base station includes receiving, from a UE, an indication that uplink data is to be transmitted while the UE is in an inactive state; and transmitting, to the UE, a measurement gap configuration for a cell reselection procedure to be performed by the UE during a transmission of the uplink data in the inactive state.

In some aspects, a UE for wireless communication includes a memory and one or more processors coupled to the memory. For example, the one or more processors may be operatively, electronically, communicatively, or otherwise coupled to the memory. The memory may include instructions executable by the one or more processors to cause the UE to determine, in an inactive state, that uplink data is to be transmitted; determine a measurement gap configuration for a cell reselection procedure to be performed during a transmission of the uplink data in the inactive state; and perform the cell reselection procedure in accordance with the measurement gap configuration.

In some aspects, a base station for wireless communication includes: a memory; and one or more processors coupled to the memory. For example, the one or more processors may be operatively, electronically, communicatively, or otherwise coupled to the memory. The memory may include instructions executable by the one or more processors to cause the base station to receive, from a UE, an indication that uplink data is to be transmitted while the UE is in an inactive state; and transmit, to the UE, a measurement gap configuration for a cell reselection procedure to be performed by the UE during a transmission of the uplink data in the inactive state.

In some aspects, a non-transitory computer-readable medium stores one or more instructions for wireless communication, where the one or more instructions, when executed by one or more processors of a UE, cause the UE to determine, in an inactive state, that uplink data is to be transmitted; determine a measurement gap configuration for a cell reselection procedure to be performed during a transmission of the uplink data in the inactive state; and perform the cell reselection procedure in accordance with the measurement gap configuration.

In some aspects, a non-transitory computer-readable medium stores one or more instructions for wireless communication, where the one or more instructions, when executed by one or more processors of a base station, cause the base station to receive, from a UE, an indication that uplink data is to be transmitted while the UE is in an inactive state; and transmit, to the UE, a measurement gap configuration for a cell reselection procedure to be performed by the UE during a transmission of the uplink data in the inactive state.

In some aspects, an apparatus for wireless communication includes means for determining, in an inactive state, that uplink data is to be transmitted; means for determining a measurement gap configuration for a cell reselection procedure to be performed during a transmission of the uplink data in the inactive state; and means for performing the cell reselection procedure in accordance with the measurement gap configuration.

In some aspects, an apparatus for wireless communication includes means for receiving, from a UE, an indication that uplink data is to be transmitted while the UE is in an inactive state; and means for transmitting, to the UE, a measurement gap configuration for a cell reselection procedure to be performed by the UE during a transmission of the uplink data in the inactive state.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
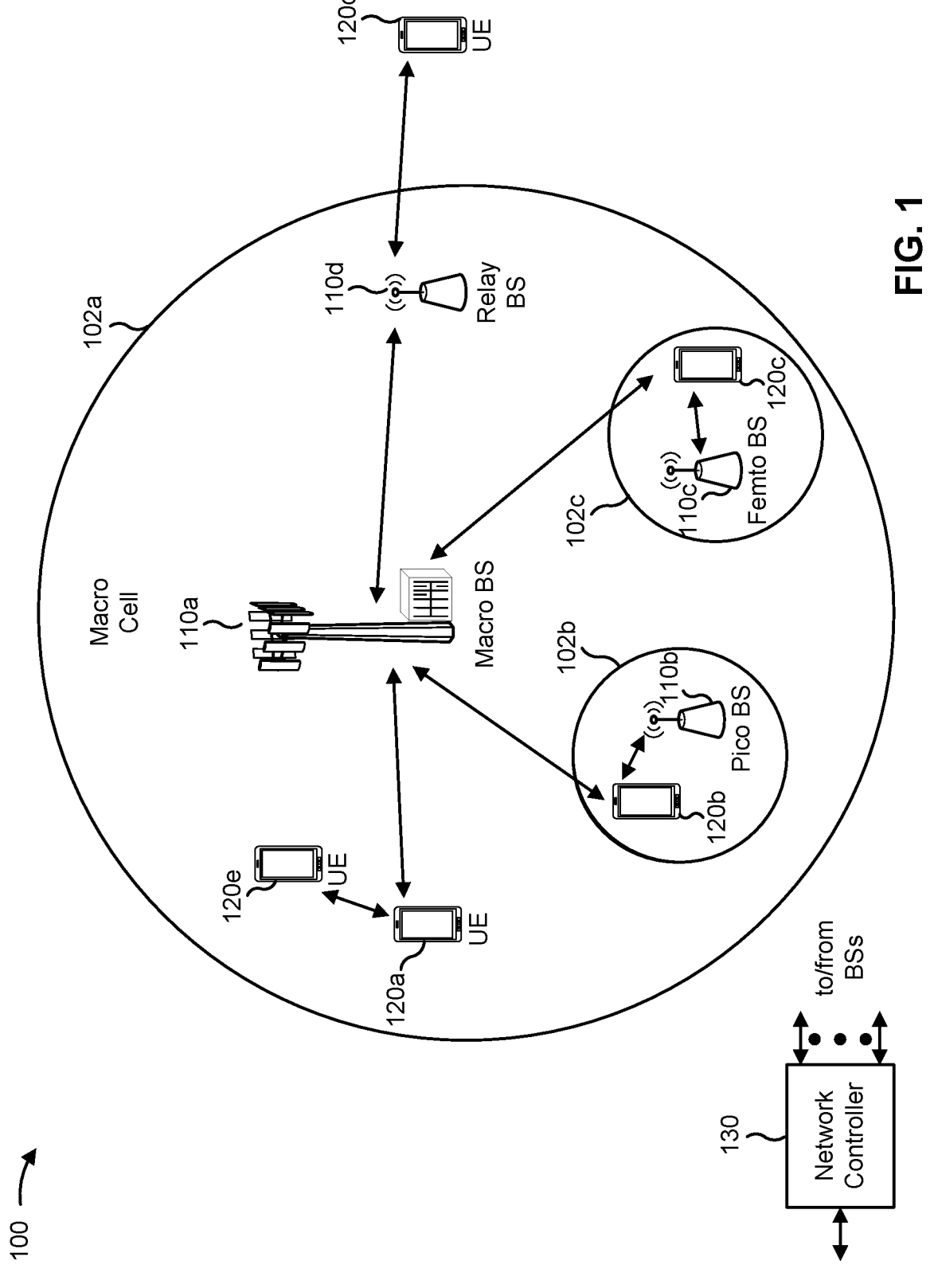
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
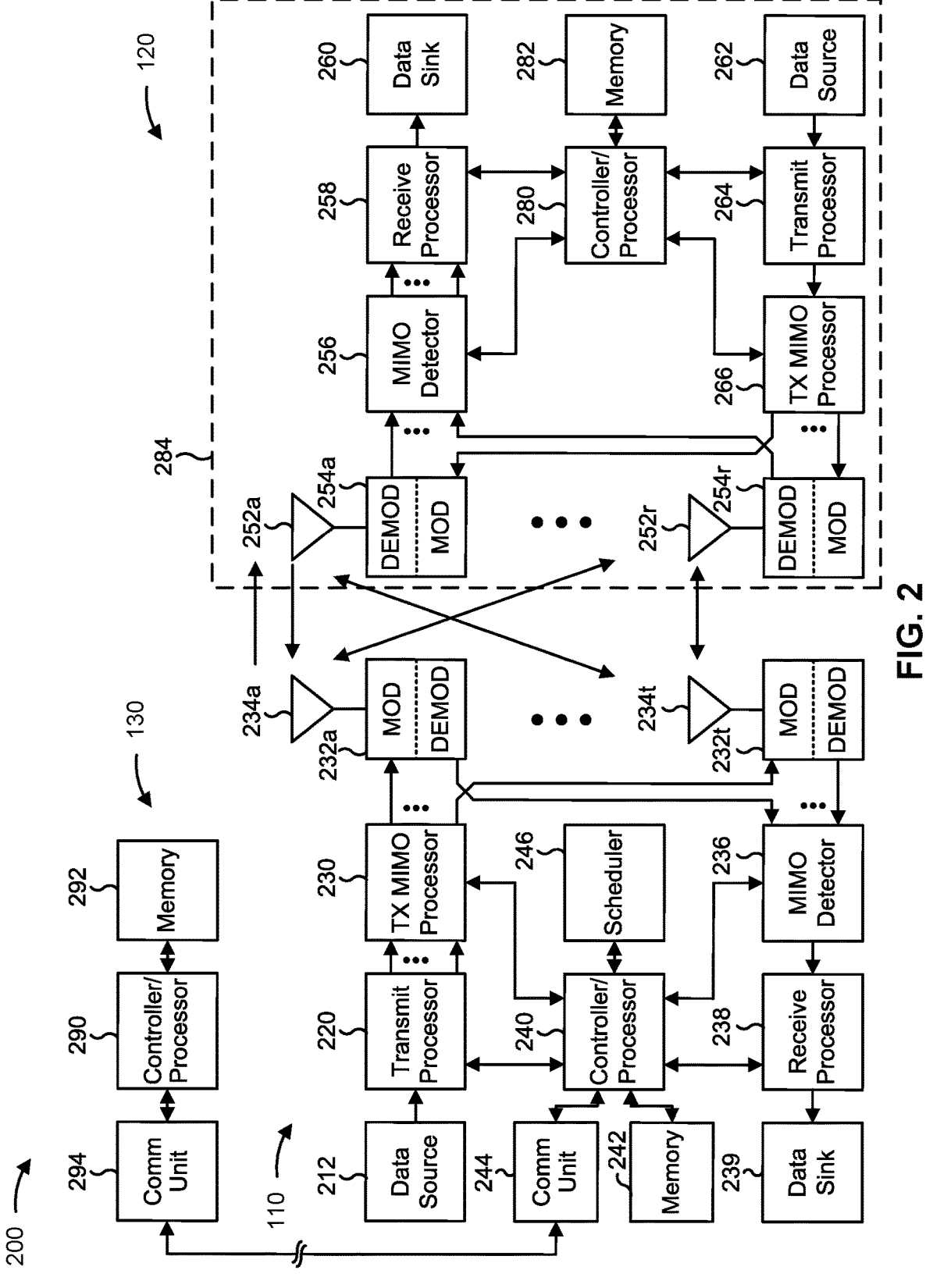
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-11.

Controller/processor 240 of base station 110, controller/processor 280 of UE 120, and/or any other component(s) of FIG. 2 may perform one or more techniques associated with measurement configuration during uplink data transfer over random access or dedicated uplink resources, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, interpreting the instructions, and/or the like.

In some aspects, UE 120 may include means for determining, in an inactive state, that uplink data is to be transmitted, means for determining a measurement gap configuration for a cell reselection procedure to be performed during a transmission of the uplink data in the inactive state, means for performing the cell reselection procedure in accordance with the measurement gap configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, an indication that uplink data is to be transmitted while the UE is in an inactive state, means for transmitting, to the UE, a measurement gap configuration for a cell reselection procedure to be performed by the UE during a transmission of the uplink data in the inactive state, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
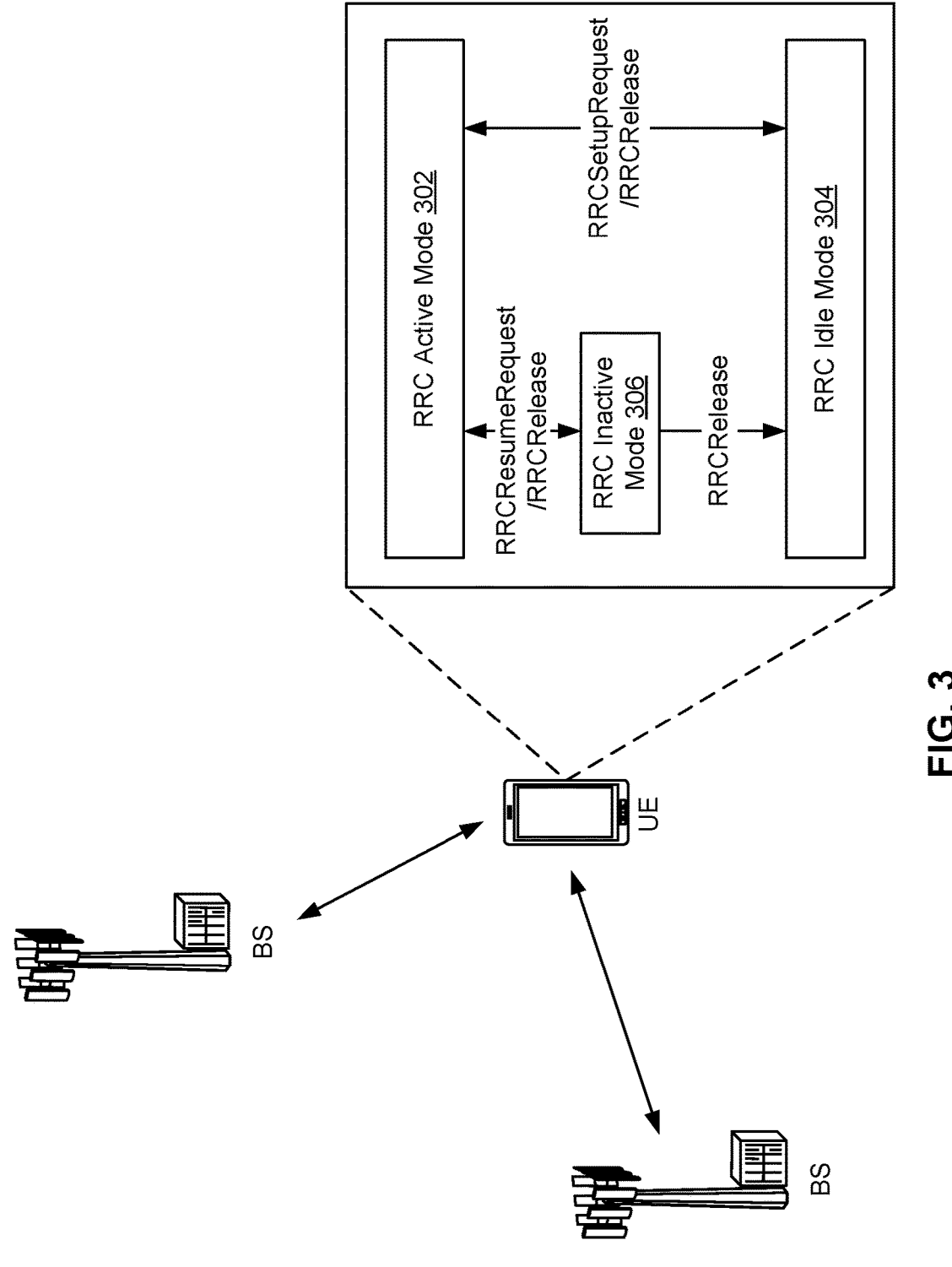
FIG. 3 illustrates an example of a wireless network in which a UE may support additional communication modes, in accordance with various aspects of the present disclosure.

FIG. 3 illustrates an example 300 of a wireless network (e.g., wireless network 100) in which a UE (e.g., UE 120) may support additional communication modes, in accordance with various aspects of the present disclosure. The UE may be communicatively connected with one or more base stations in the wireless network. For example, the UE may be connected to the one or more base stations in a dual connectivity configuration. In this case, a first base station may serve the UE as a master node and a second base station may serve the UE as a secondary node.

As illustrated in FIG. 3, the UE may support a connected communication mode (e.g., a radio resource control (RRC) active mode 302), an idle communication mode (e.g., an RRC idle mode 304), an inactive communication mode (e.g., an RRC inactive mode 306), and/or the like. RRC inactive mode 306 may functionally reside between RRC active mode 302 and RRC idle mode 304.

The UE may transition between different modes based at least in part on various commands and/or communications received from the one or more base stations. For example, the UE may transition from RRC active mode 302 or RRC inactive mode 306 to RRC idle mode 304 based at least in part on receiving an RRCRelease communication. As another example, the UE may transition from RRC active mode 302 to RRC inactive mode 306 based at least in part on receiving an RRCRelease with suspendConfig communication. As another example, the UE may transition from RRC idle mode 304 to RRC active mode 302 based at least in part on receiving an RRCSetupRequest communication. As another example, the UE may transition from RRC inactive mode 306 to RRC active mode 302 based at least in part on receiving an RRCResumeRequest communication.

When transitioning to RRC inactive mode 306, the UE and/or the one or more base stations may store a UE context (e.g., an access stratum (AS) context, higher-layer configurations, and/or the like). This permits the UE and/or the one or more base stations to apply the stored UE context when the UE transitions from RRC inactive mode 306 to RRC active mode 302 in order to resume communications with the one or more base stations, which reduces latency of transitioning to RRC active mode 302 relative to transitioning to the RRC active mode 302 from RRC idle mode 304.

In some cases, the UE may communicatively connect with a new master node when transitioning from RRC idle mode 304 or RRC inactive mode 306 to RRC active mode 302 (e.g., a master node that is different from the last serving master node when the UE transitioned to RRC idle mode 304 or RRC inactive mode 306). In this case, the new master node may be responsible for identifying a secondary node for the UE in the dual connectivity configuration.

As indicated above, FIG. 3 is provided as an example. Other examples may differ from what is described with regard to FIG. 3.

Figure 4:
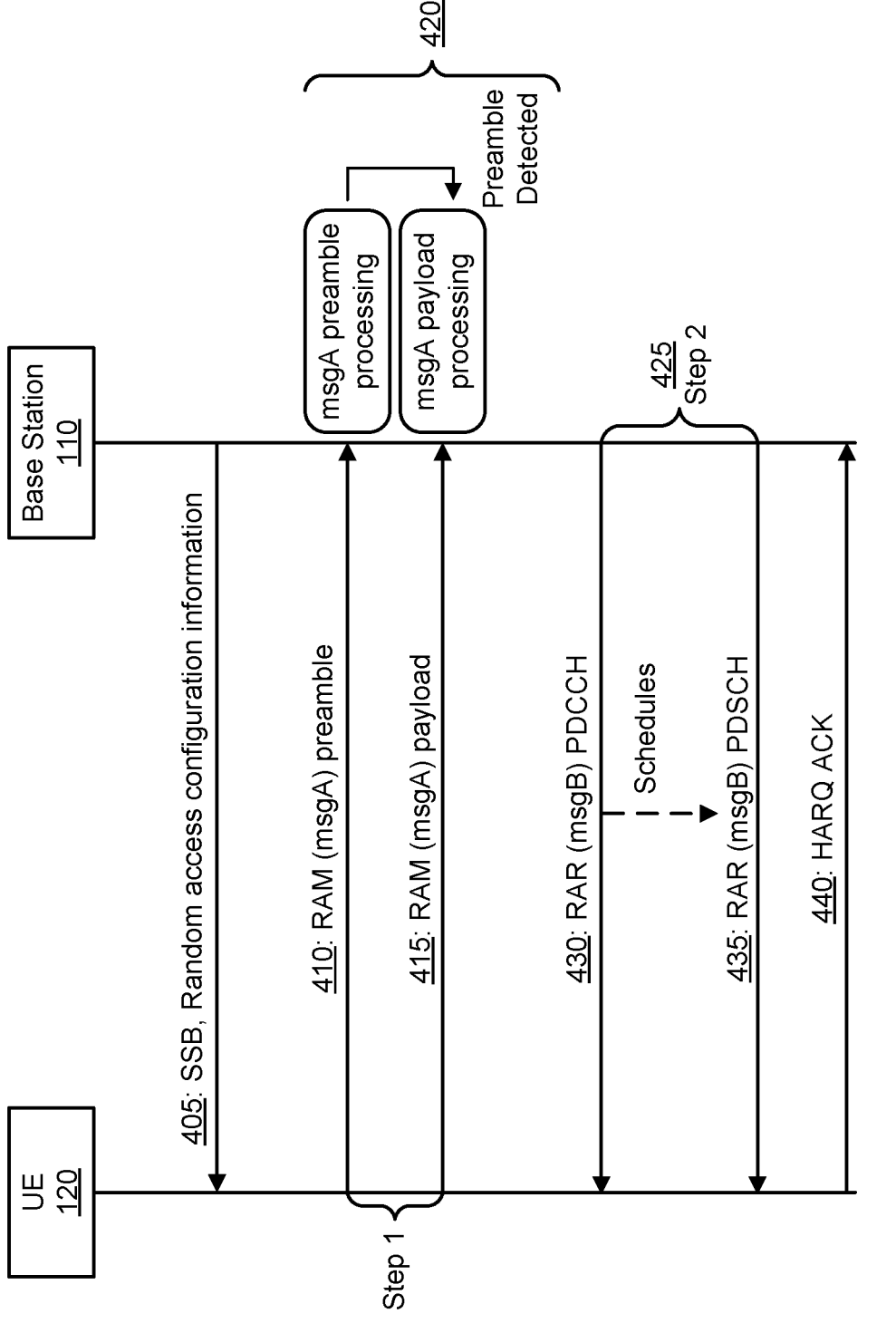
FIG. 4 is a diagram illustrating an example of a two-step random access procedure, in accordance with various aspects of the present disclosure.

FIG. 4 is a diagram illustrating an example 400 of a two-step random access procedure, in accordance with various aspects of the present disclosure. As shown in FIG. 4, a base station 110 and a UE 120 may communicate with one another to perform the two-step random access procedure.

As shown by reference number 405, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a random access channel (RACH) procedure, such as for contention-free random access. The random access configuration information may include one or more parameters to be used in the two-step random access procedure, such as one or more parameters for transmitting a random access message (RAM), receiving a random access response (RAR) to the RAM, and/or the like.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, an initial message, and/or the like in a two-step random access procedure. Furthermore, in some aspects, the RAM preamble may be referred to as a message A preamble, a msgA preamble, a preamble, a physical random access channel (PRACH) preamble, and/or the like, and the RAM payload may be referred to as a message A payload, a msgA payload, a payload, and/or the like. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), a physical uplink shared channel (PUSCH) transmission, and/or the like).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, contention resolution information, and/or the like.

As shown by reference number 430, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 435, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 440, if the UE 120 successfully receives the RAR, the UE 120 may transmit a hybrid automatic repeat request (HARD) acknowledgement (ACK).

As indicated above, FIG. 4 is provided as an example. Other examples may differ from what is described with regard to FIG. 4.

Figure 5:
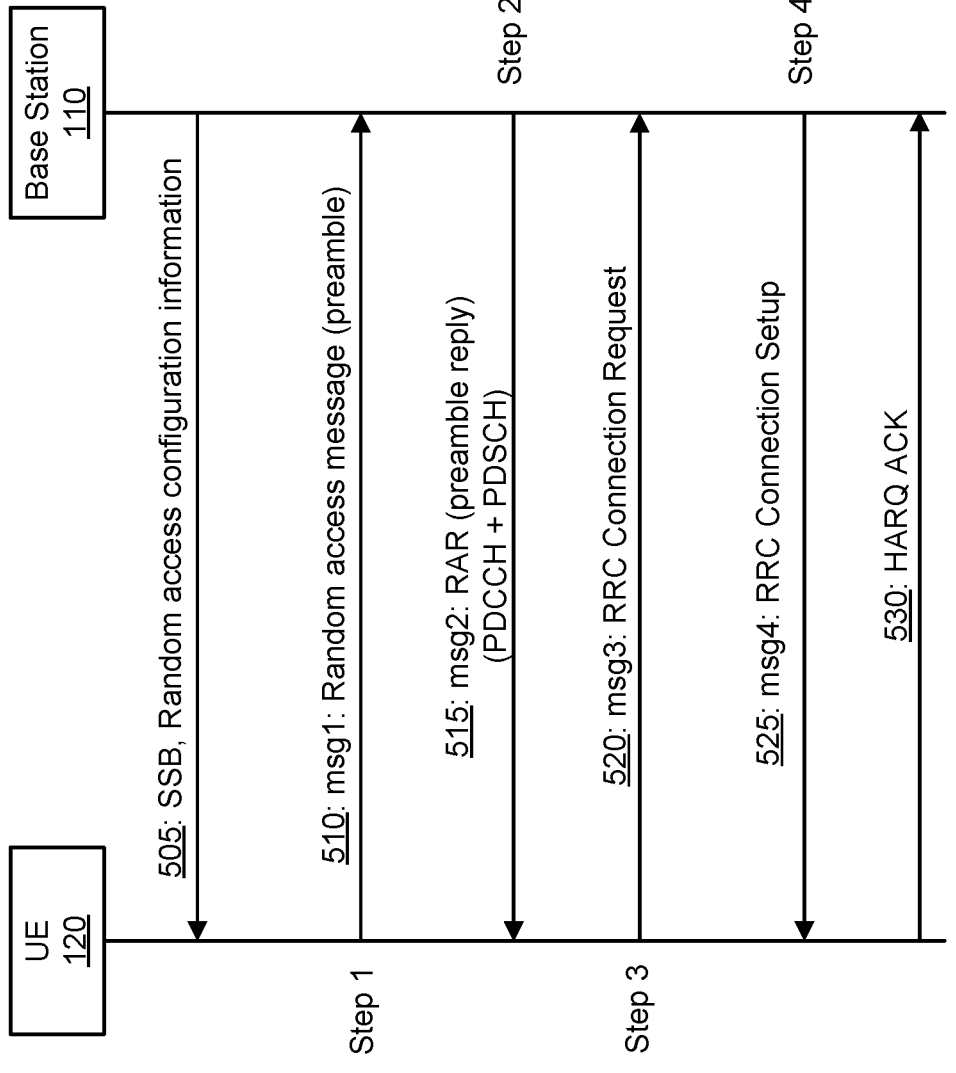
FIG. 5 is a diagram illustrating an example of a four-step random access procedure, in accordance with various aspects of the present disclosure.

FIG. 5 is a diagram illustrating an example 500 of a four-step random access procedure, in accordance with various aspects of the present disclosure. As shown in FIG. 5, a base station 110 and a UE 120 may communicate with one another to perform the four-step random access procedure.

As shown by reference number 505, the base station 110 may transmit, and the UE 120 may receive, one or more SSBs and random access configuration information. In some aspects, the random access configuration information may be transmitted in and/or indicated by system information (e.g., in one or more SIBs and/or the like) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM, one or more parameters for receiving an RAR, and/or the like.

As shown by reference number 510, the UE 120 may transmit a RAM, which may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step random access procedure. The random access message may include a random access preamble identifier.

As shown by reference number 515, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 520, the UE 120 may transmit an RRC connection request message. The RRC connection request message may be referred to as message 3, msg3, MSG3, or a third message of a four-step random access procedure. In some aspects, the RRC connection request may include a UE identifier, UCI, a PUSCH communication (e.g., an RRC connection request), and/or the like.

As shown by reference number 525, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, contention resolution information, and/or the like. As shown by reference number 530, if the UE 120 successfully receives the RRC connection setup message, the UE 120 may transmit a HARQ ACK.

As indicated above, FIG. 5 is provided as an example. Other examples may differ from what is described with regard to FIG. 5.

A UE may enter an inactive state, such as an RRC inactive state, to conserve battery power and network resources in times of infrequent data traffic. An "inactive state" may refer to a UE that is operating in an inactive communication mode (e.g., an RRC inactive mode, as described above with respect to FIG. 3, and/or the like). Entering an active state from the inactive state may involve a random access channel (RACH) procedure or another form of establishment procedure. In many applications, the UE may generate only a small amount of data in a burst of a data session. Examples of such applications include enhanced mobile broadband (eMBB) communications, Internet of Things (IoT) communications, instant messaging applications, social media applications, wearable device applications, and/or the like. The establishment of an RRC connection using the RACH procedures shown in FIGS. 4 and 5 may consume significant resources of the UE and the network. Therefore, in some scenarios, it may be inefficient to establish an RRC connection for an uplink data transfer. For example, it may be wasteful of the UE's resources and network resources to reestablish an RRC connection solely to transmit a small data burst.

Some radio access technologies may provide a service for transmitting a small data transmission in an inactive mode, such as via an uplink RACH message or a configured uplink resource (e.g., a dedicated preconfigured uplink resource, a preconfigured uplink resource, a dedicated uplink resource, and/or the like). However, not all small data transmissions may fit within an uplink RACH message or a configured uplink resource. Furthermore, in some cases, an uplink resource may not be configured for the UE. Therefore, providing a small data transmission via an uplink RACH message or a configured uplink resource (e.g., without regard for the size of the data transmission or the configured uplink resource) may lead to failed uplink transmissions, retransmissions, and/or the like.

Therefore, in some cases, small data transmission using an uplink RACH message or a configured uplink resource may be based at least in part on one or more size thresholds (e.g., a transport block size (TBS) threshold and/or the like). For example, if the uplink data fails to satisfy a size threshold (e.g., is smaller than or equal to, or is smaller than, the size threshold), the UE may transmit the uplink data on an uplink RACH message or a configured uplink resource (e.g., based at least in part on one or more other thresholds or another value associated with the size threshold) without establishing an RRC connection. In this way, the UE can reduce the singling overhand and latency caused by RRC connection setup and release for the transmission of the uplink data. If the uplink data satisfies the size threshold (e.g., is larger than, or is larger than or equal to, the size threshold), then the UE may establish an RRC connection to transmit the uplink data. In this way, the UE may selectively provide uplink data via an uplink RACH resource or a configured uplink resource based at least in part on a size of the uplink data.

Figure 6:
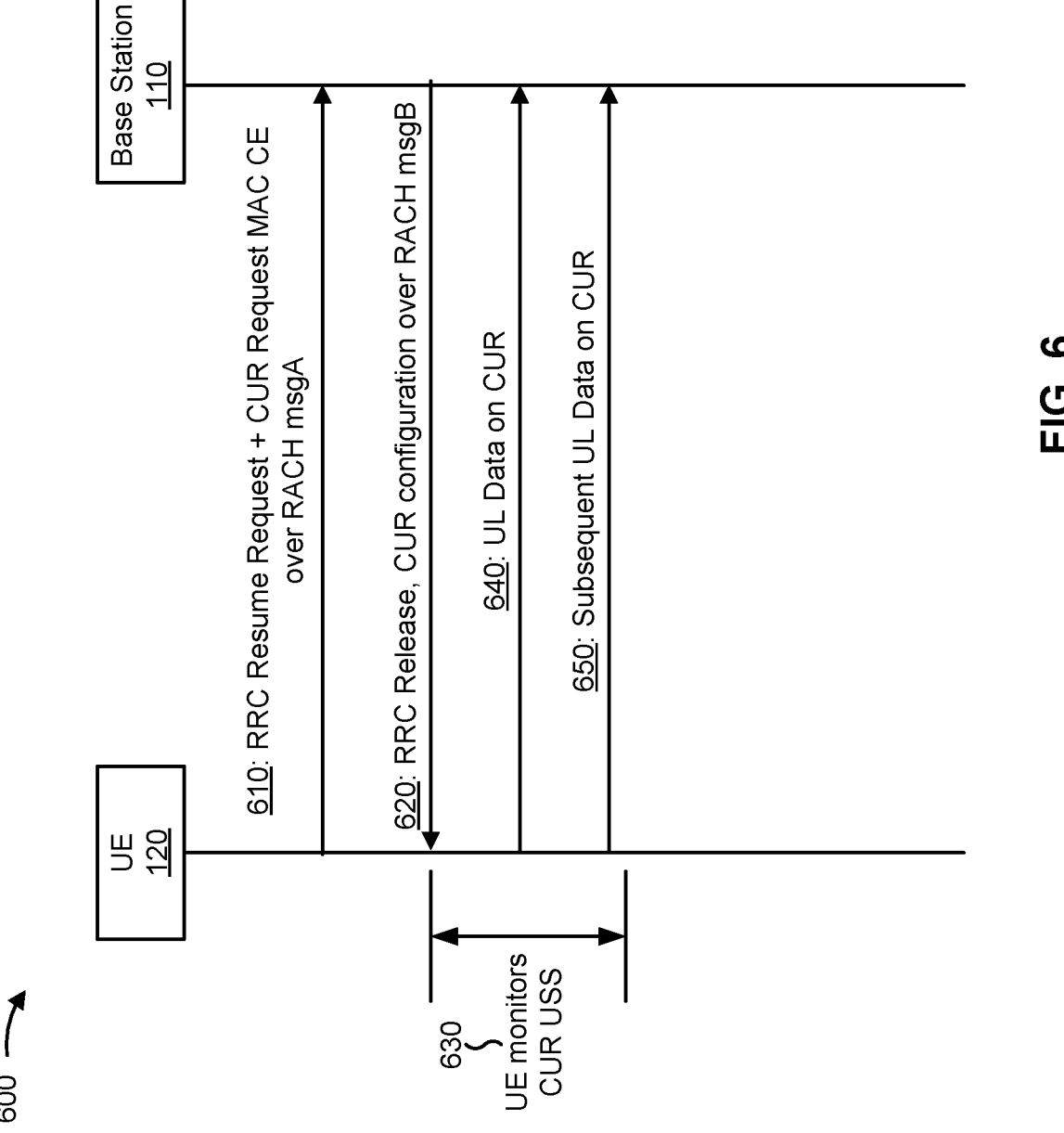
FIGS. 6-8 are diagrams illustrating examples associated with uplink data transfer over random access or dedicated uplink resources, in accordance with various aspects of the present disclosure.
Figure 7:
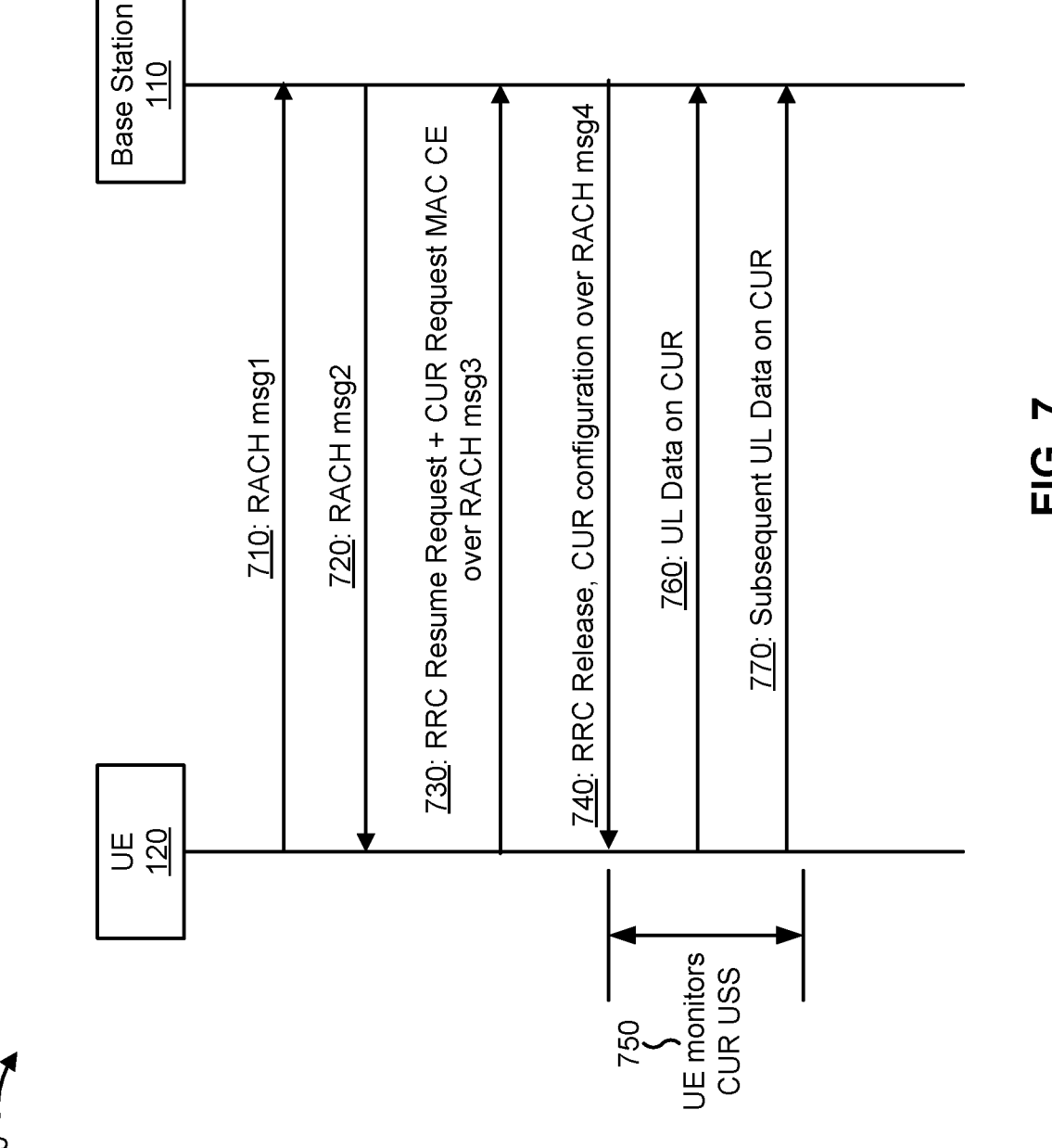
Figure 8:
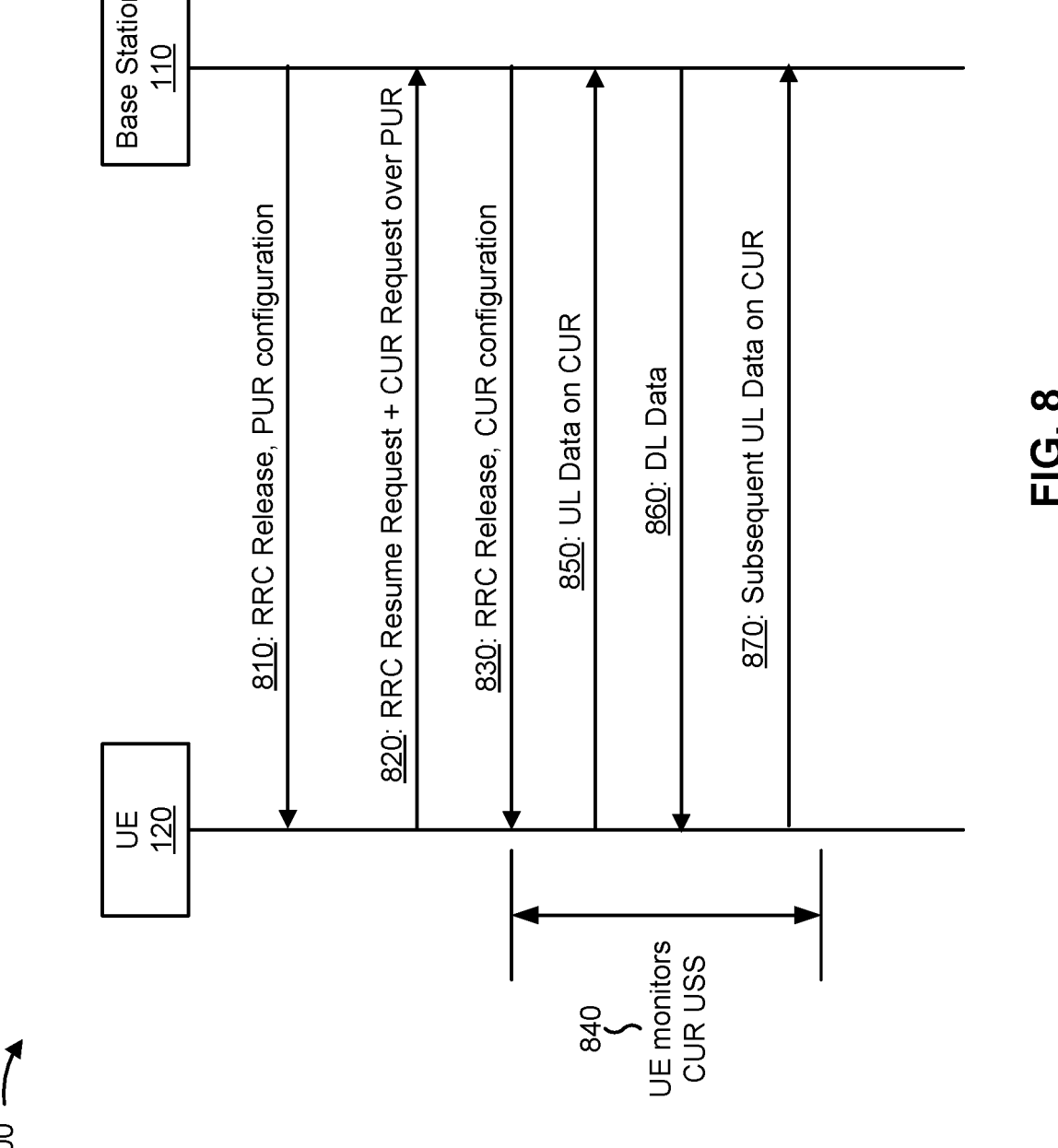

FIGS. 6-8 are diagrams illustrating examples 600, 700, and 800 associated with uplink data transfer over random access or dedicated uplink resources, in accordance with various aspects of the present disclosure. Examples 600 and 700 illustrate two-step and four-step RACH procedures, respectively, where a UE 120 transmits uplink data in an inactive mode. Example 800 illustrates a UE 120 transmitting uplink data in an inactive mode using a preconfigured uplink resource (e.g., a configured grant uplink resource).

As shown in FIG. 6, and by reference number 610, the UE 120 may transmit an RRC resume request in a RACH msgA. As further shown, the RRC resume request may include a configured uplink resource (CUR) request, such as a MAC control element (MAC-CE) indicating the CUR request. In some aspects, an RRC parameter of the RRC message (e.g., an RRCResumeRe quest parameter and/or the like) may indicate an amount of data of a data transfer and/or a traffic pattern associated with the data transfer. In some aspects, the CUR request may comprise a resume identifier, an authentication token (e.g., a shortResumeMac-I or a resume MAC-I), and/or the like.

A CUR configuration may include a configured uplink resource, a preconfigured uplink resource, a dedicated uplink resource, a dedicated preconfigured uplink resource (D-PUR), and/or the like. A CUR configuration may be a resource on which the UE 120 can perform an uplink transmission without entering an RRC connected mode or an RRC active mode. In some aspects, a CUR configuration may have a TBS sufficient to transmit a data transfer in a single transport block, which is referred to as a one-shot CUR. In some aspects, a CUR configuration may comprise multiple resources that are distributed in the time domain, so that the UE 120 can transmit uplink data after an initial uplink data transmission, or can transmit the uplink data on the multiple resources, which is referred to as a multi-shot CUR. In some aspects, a multi-shot CUR may include a configured grant CUR, a periodic CUR, a semi-persistent CUR, and/or the like.

As shown in example 600, the CUR request may request a multi-shot CUR. As shown by reference number 620, the UE 120 may receive a CUR configuration (e.g., configuration information configuring a CUR) via a RACH message, such as an RRC release message carried by a RACH msgB. As shown by reference number 630, the UE 120 may monitor a UE-specific search space (USS) associated with the CUR. For example, a USS may carry control information associated with a specific UE (here, the UE 120). Thus, the UE 120 may monitor the USS for scheduling information associated with transmitting the uplink data, subsequent uplink data, transmitting retransmission of uplink data, and/or the like. For example, as shown by reference number 640, the UE 120 may transmit the uplink data on the CUR configured by the CUR configuration (e.g., based at least in part on receiving scheduling information in the USS indicating to transmit the uplink data on the CUR). Furthermore, as shown by reference number 650, the UE 120 may transmit subsequent uplink data on the CUR (e.g., based at least in part on receiving scheduling information in the USS indicating to transmit the subsequent uplink data on the CUR). The example 600 of FIG. 6 may illustrate a procedure for requesting a CUR and performing a multi-shot transmission of uplink data in an inactive mode in connection with a two-step RACH procedure.

As shown in FIG. 7, and by reference number 710, the UE 120 may transmit RACH msg1 to the base station 110. As shown by reference number 720, the base station 110 may transmit RACH msg2 to the UE 120. As shown by reference number 730, the UE 120 may transmit an RRC resume request in a RACH msg3. As further shown, the RRC resume request may include a CUR request, such as a MAC-CE indicating the CUR request. In this case, the CUR request may request a multi-shot CUR, as described in more detail elsewhere herein. As shown by reference number 740, the UE 120 may receive a CUR configuration (e.g., configuration information configuring a CUR) via a RACH message, such as an RRC release message carried by a RACH msg4. As shown by reference number 750, the UE 120 may monitor a USS associated with the CUR. As shown by reference number 760, the UE 120 may transmit the uplink data on the CUR configured by the CUR configuration (e.g., based at least in part on receiving scheduling information in the USS indicating to transmit the uplink data on the CUR). Furthermore, as shown by reference number 770, the UE 120 may transmit subsequent uplink data on the CUR (e.g., based at least in part on receiving scheduling information in the USS indicating to transmit the subsequent uplink data on the CUR). The example 700 of FIG. 7 may illustrate a procedure for requesting a CUR and performing a multi-shot transmission of uplink data in an inactive mode in connection with a four-step RACH procedure.

As shown in FIG. 8, and by reference number 810, the base station 110 may transmit, and the UE 120 may receive, a preconfigured uplink resource (PUR) configuration (e.g., configuration information configuring a PUR). In some aspects, the base station 110 may transmit the PUR configuration via a RACH message, such as an RRC release message. In some aspects, the PUR may be a configured grant uplink resource, a D-PUR, and/or the like. As shown by reference number 820, the UE 120 may transmit an RRC resume request that includes a CUR request over the PUR. In this case, the CUR request may request a multi-shot CUR, as described in more detail elsewhere herein. As shown by reference number 830, the UE 120 may receive a CUR configuration (e.g., configuration information configuring a CUR) via an RRC release message. As shown by reference number 840, the UE 120 may monitor a USS associated with the CUR. As shown by reference number 850, the UE 120 may transmit the uplink data on the CUR configured by the CUR configuration (e.g., based at least in part on receiving scheduling information in the USS indicating to transmit the uplink data on the CUR). As shown by reference number 860, the UE 120 may receive downlink data from the base station 110 (e.g., based at least in part on receiving scheduling information in the USS indicating to receive the downlink data). Furthermore, as shown by reference number 870, the UE 120 may transmit subsequent uplink data on the CUR (e.g., based at least in part on receiving scheduling information in the USS indicating to transmit the subsequent uplink data on the CUR). The example 800 of FIG. 8 may illustrate a procedure for requesting a CUR and performing a multi-shot transmission of uplink data in an inactive mode in connection with a PUR.

As indicated above, FIGS. 6-8 are provided as examples. Other examples may differ from what is described with regard to FIGS. 6-8.

In some wireless networks, a UE may be configured, by a base station of a serving cell, to perform measurements of one or more neighbor cells. For example, the UE may be configured to perform intra-frequency measurements (e.g., the serving cell and the one or more neighbor cells may operate using a same operating frequency and a same subcarrier spacing (SCS)), inter-frequency measurements (e.g., the serving cell may operate using a first operating frequency (and/or a first SCS) and the one or more neighbor cells may operate using a second operating frequency (and/or a second SCS)), inter-radio access technology (RAT) measurements (e.g., the serving cell may be associated with a first RAT and the one or more neighbor cells may be associated with a second RAT), and/or the like. In some aspects, a UE may be required to tune radio frequency (RF) components of the UE to enable the UE to perform measurements on a target band (e.g., a band used by a neighbor cell). As a result, communications in a serving band (e.g., a band used by the serving cell) may be interrupted while the UE is tuned to the target band. Therefore, the base station of the serving cell may configure measurement gaps (e.g., during which the UE does not transmit and/or receive communications associated with the serving cell) during which the UE is enabled to perform the measurements of the one or more neighboring cells.

It may be beneficial for a UE to continue cell reselection measurements and cell reselection evaluations (e.g., cell reselection procedures) during small data transmissions (e.g., as described above with respect to FIGS. 6-8). For example, where subsequent uplink data is transmitted by the UE in an inactive mode, it is beneficial to enable mobility of the UE by having the UE continue to perform cell reselection procedures during the small data transmissions. However, while a UE is in an inactive mode, such as an RRC inactive mode, the serving cell may not configure or enable measurement gap based measurements. As described above, the UE may monitor a USS for scheduling information associated with uplink data transmissions while in the inactive mode. As a result, without any configured measurement gaps, scheduling information transmitted in the USS may not be received by the UE, if the UE is performing cell reselection measurements when the scheduling information is transmitted in the USS.

Some techniques and apparatuses described herein enable measurement gap configuration during uplink data transfer over random access or dedicated uplink resources. For example, the base station may configure measurement gaps for the UE in a RACH message, such as a MsgB of a two-step RACH procedure or a message 4 of a four-step RACH procedure. In some aspects, the base station may determine a measurement gap configuration based at least in part on a traffic pattern (e.g., that is indicated by the UE in an uplink RACH message or an uplink RRC message) associated with the small data transmissions by the UE in an inactive mode. In some aspects, the UE may indicate measurement gap requirement information in a RACH message, such as a MsgA of a two-step RACH procedure or a message 3 of a four-step RACH procedure. In some aspects, the UE may determine one or more autonomous measurement gaps (e.g., an autonomous measurement gap may be a measurement gap that is determined by the UE without a measurement gap configuration from a base station, a measurement gap that is determined by the UE by modifying a measurement gap configured by a base station, and/or the like) for performing measurements associated with a cell reselection procedure during small data transmissions in an inactive mode. In some aspects, the UE may be configured to use previously performed measurements (e.g., performed prior to transmitting uplink data in an inactive mode) in a cell reselection procedure during small data transmissions in an inactive mode. As a result, the UE may be enabled to perform cell reselection procedures during small data transmission in an inactive mode, thereby improving mobility of the UE, improving reliability of communications, and/or the like. Additionally, the UE may be configured with measurement gaps such that scheduling information transmitted in the USS during small data transmission in an inactive mode is not missed by the UE due to the UE performing a measurement associated with a cell reselection procedure. This improves the reliability and reduces latency associated with the small data transmission in an inactive mode.

Figure 9:
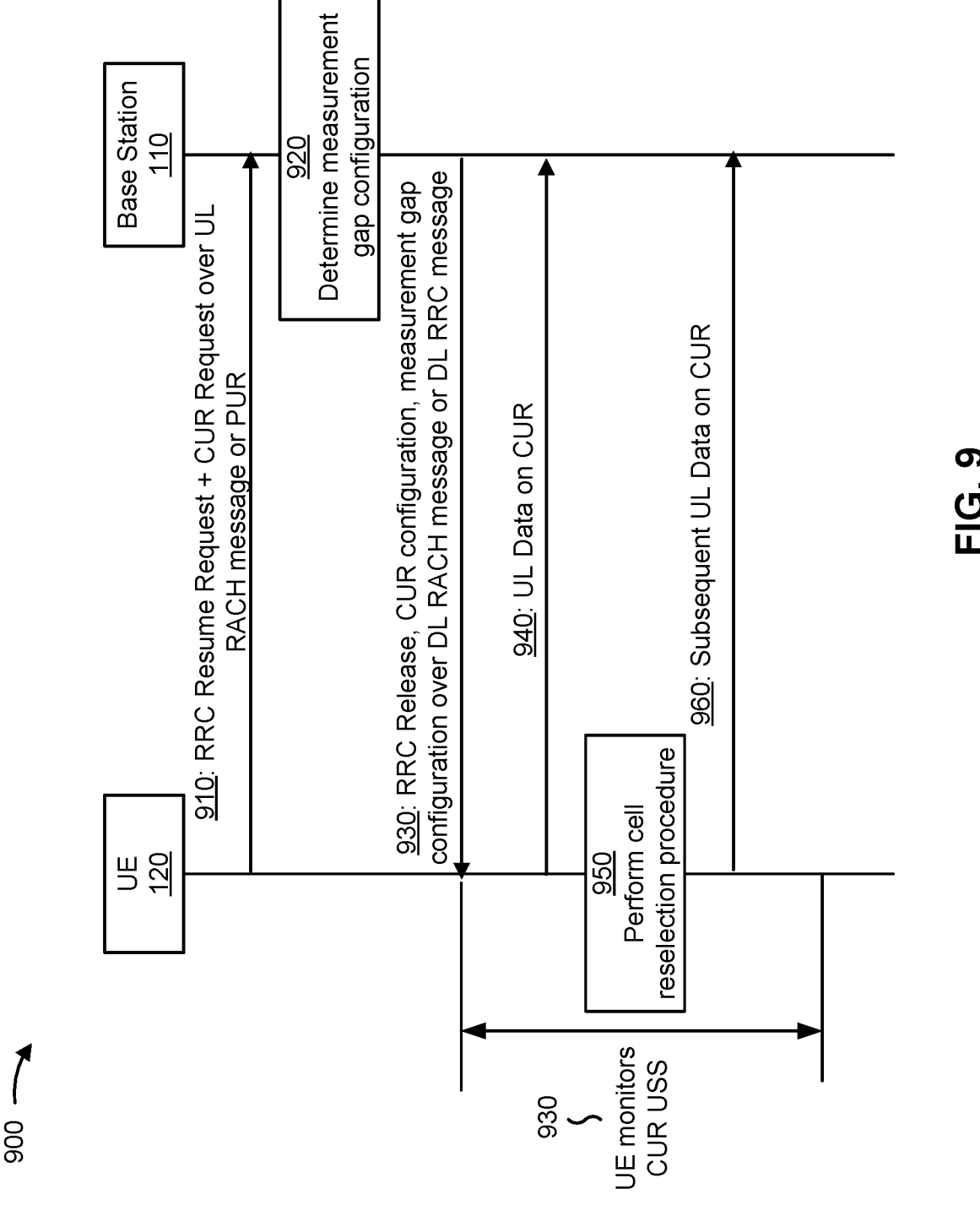
FIG. 9 is a diagram illustrating an example associated with measurement configuration during uplink data transfer over random access or dedicated uplink resources, in accordance with various aspects of the present disclosure.

FIG. 9 is a diagram illustrating an example 900 associated with measurement configuration during uplink data transfer over random access or dedicated uplink resources, in accordance with various aspects of the present disclosure. As shown in FIG. 9, example 900 includes communication between a base station 110 and a UE 120. In some aspects, the base station 110 and the UE 120 may be included in a wireless network, such as wireless network 100. The base station 110 and the UE 120 may communicate on a wireless access link, which may include an uplink and a downlink. Example 900 illustrates an example in which the UE 120 has determined to transmit uplink data (e.g., a small data transmission) in an inactive mode (e.g., an RRC inactive mode) during a RACH procedure (e.g., two-step RACH procedure or a four-step RACH procedure) or over a PUR.

As show by reference number 910, the UE 120 may transmit, and the base station 110 may receive, a CUR request for a CUR to be used to transmit the uplink data. The UE 120 may transmit the CUR request using an uplink RACH message (e.g., a MsgA of a two-step RACH procedure, a message 3 of a four-step RACH procedure, and/or the like), or using a PUR (e.g., a configured grant uplink resource, a D-PUR, and/or the like). In some aspects, the UE 120 may transmit the CUR request in a MAC-CE. As described above, the CUR request may indicate buffer status information of the UE 120, a traffic pattern (e.g., one shot, multi-shot, single transmission, multiple transmission, periodic transmission, semi-persistent transmission, and/or the like) associated with the uplink data that is to be transmitted, a periodicity associated with the uplink data that is to be transmitted, a size of the uplink data that is to be transmitted, and/or the like.

In some aspects, the communication transmitted by the UE 120 using the uplink RACH message or the PUR may indicate measurement gap requirement information (e.g., a NeedForGapsInfoNR parameter of a RRC resume procedure) associated with performing a cell reselection procedure during the transmission of the uplink data in the inactive mode. The measurement gap requirement information may be indicated in an RRC parameter (RRCResumeRequest parameter, a NeedForGapsInfoNR parameter, a needForGapsConfigNR parameter, and/or the like) of the RRC resume request, in an RRC message, in the CUR request, and/or the like. The measurement gap requirement information may indicate measurement gap information for target bands associated with a cell reselection procedure (e.g., target bands that the UE 120 is to perform measurements in associated with the cell reselection procedure). The measurement gap requirement information may indicate a measurement gap pattern or periodicity. The measurement gap requirement information may indicate a measurement gap capability of the UE 120 (e.g., indicating a quantity or frequency of measurement gaps that can be supported by the UE 120).

As shown by reference number 920, the base station 110 may determine a measurement gap configuration associated with a cell reselection procedure to be performed by the UE 120 during the transmission of the uplink data in the inactive mode. In some aspects, the base station 110 may determine the measurement gap configuration based at least in part on the CUR request. For example, the base station 110 may determine the measurement gap configuration based at least in part on a traffic pattern of the uplink data indicated in the CUR request. The base station 110 may determine the traffic pattern of the uplink data based at least in part on an explicit indication in the CUR request. In some aspects, the station 110 may implicitly determine the traffic pattern of the uplink data based at least in part on buffer status information indicated in the CUR request.

In some aspects, if the CUR request indicates that the uplink data is to be transmitted in a single instance (e.g., one shot traffic, a single uplink transmission on a CUR, and/or the like), the base station 110 may determine that no measurement gaps are required to be configured (e.g., as the base station 110 may configure the UE 120 to perform measurements during measurement gaps after the single uplink transmission). In some aspects, if the CUR request indicates that the uplink data is to be transmitted in multiple instances (e.g., multi-shot traffic, periodic uplink transmission on a CUR, semi-persistent uplink transmission on a CUR, and/or the like), the base station 110 may determine one or more measurement gaps during which the UE 120 is perform measurements associated with the cell reselection procedure. The base station 110 may determine the one or more measurement gaps based at least in part on a timing of the uplink transmission, a pattern or periodicity of the uplink transmissions, and/or the like.

In some aspects, the base station 110 may determine the measurement gap configuration based at least in part on the measurement gap requirement information indicated by the UE 120. For example, the base station 110 may determine the measurement gap configuration based at least in part on receiving the indication of the measurement gap requirement information from the UE 120. The base station 110 may determine one or more measurement gaps during which the UE 120 is perform measurements associated with the cell reselection procedure based at least in part on information indicated by the measurement gap requirement information.

As shown by reference number 930, the base station 110 may transmit, and the UE 120 may receive, a CUR configuration (e.g., configuration information configuring a CUR) via an RRC release message carried by a downlink RACH message (e.g., a MsgB of a two-step RACH procedure, a message 4 of a four-step RACH procedure, and/or the like) or a downlink RRC message. In some aspects, if the base station 110 determines that one or more measurement gaps are to be configured, the communication (e.g., carried by the downlink RACH message or the downlink RRC message) may indicate the measurement gap configuration. The measurement gap configuration may be indicated in a parameter (e.g., a measGapConfig parameter and/or the like) of the downlink RACH message or the downlink RRC message.

In some aspects, the base station 110 may determine that no measurement gaps are to be configured during the transmission of the uplink data. In some aspects, the base station 110 may configure the UE 120 to perform a cell reselection procedure during the transmission of the uplink data without performing measurements during the transmission of the uplink data. For example, the base station 110 may configure the UE 120 to use measurements of one or more neighbor cells performed prior to the transmission of the uplink data to perform a cell reselection evaluation procedure(s) during the transmission of the uplink data. In some aspects, the base station 110 may indicate that the UE 120 is to use measurements of one or more neighbor cells performed prior to the transmission of the uplink data to perform the cell reselection evaluation procedure(s) during the transmission of the uplink data in the downlink RACH message or the downlink RRC message.

As shown by reference number 930, the UE 120 may monitor a USS associated with the CUR. For example, a USS may carry control information associated with a specific UE (here, the UE 120). Thus, the UE 120 may monitor the USS for scheduling information associated with transmitting the uplink data, subsequent uplink data, transmitting retransmission of uplink data, and/or the like. For example, the UE 120 may monitor a control channel (e.g., a PDCCH) associated with a specific radio network temporary identifier RNTI (e.g., a cell RNTI (C-RNTI), an inactive-RNTI (I-RNTI), or another type of RNTI) within the USS associated with the CUR. As shown by reference number 940, the UE 120 may transmit the uplink data on the CUR configured by the CUR configuration (e.g., based at least in part on receiving scheduling information in the USS indicating to transmit the uplink data on the CUR).

As shown by reference number 950, the UE 120 may perform a cell reselection procedure during the transmission of the uplink data in an inactive mode. In some aspects, the UE 120 may perform the cell reselection procedure in accordance with the measurement gap configuration. The cell reselection procedure may be an inter-frequency cell reselection procedure, an intra-frequency cell reselection procedure, or an inter-RAT cell reselection procedure.

For example, the UE 120 may determine the measurement gap configuration for the cell reselection procedure. The UE 120 may determine the measurement gap configuration for the cell reselection procedure based at least in part on receiving an indication of the measurement gap configuration from the base station 110 (e.g., as described above). The UE 120 may determine one or more measurement gaps indicated by the measurement gap configuration. The UE 120 may perform one or more measurements of one or more neighbor cells during a measurement gap. The UE 120 may perform a cell reselection evaluation procedure based at least in part on measurement values determined by performing the one or more measurements. In some aspects, the UE 120 may indicate the measurement values to the base station 110 to enable the base station 110 to initiate a handover procedure as part of the cell reselection procedure (e.g., if the measurement values indicate that the serving cell should be changed from the cell associated with the base station 110 to a neighbor cell).

In some aspects, the communications described above with respect to reference numbers 910 and 930 may not include information associated with the measurement gap configuration (e.g., the UE 120 may not transmit measurement gap requirement information and/or the base station 110 may not transmit the measurement gap configuration). In that case, the UE 120 may be enabled to determine one or more autonomous measurement gaps for performing measurements associated with the cell reselection procedure. For example, the USS for monitoring the control channel with the specific RNTI may be sparse enough (e.g., if the USS has few PDCCH candidates and/or the like) for the UE 120 to perform measurement gap based measurements without an explicit indication of the measurement gaps from the base station 110. The UE 120 may determine one or more autonomous measurement gaps based at least in part on the configuration of the USS. The UE 120 may perform one or more measurements of one or more neighbor cells during an autonomous measurement gap. The UE 120 may perform a cell reselection evaluation procedure based at least in part on measurement values determined by performing the one or more measurements. In some aspects, the UE 120 may indicate the measurement values to the base station 110 to enable the base station 110 to initiate a handover procedure as part of the cell reselection procedure (e.g., if the measurement values indicate that the serving cell should be changed from the cell associated with the base station 110 to a neighbor cell).

In some aspects, as described above, the UE 120 may be configured to use measurements of one or more neighbor cells performed prior to the transmission of the uplink data during the cell reselection procedure. For example, the UE 120 may not be required to perform measurements during the transmission of the uplink data. Rather, the UE 120 may perform a cell reselection evaluation procedure based at least in part on measurement values determined by performing the measurements of one or more neighbor cells performed prior to the transmission of the uplink data. In some aspects, the UE 120 may indicate the measurement values to the base station 110 to enable the base station 110 to initiate a handover procedure as part of the cell reselection procedure (e.g., if the measurement values indicate that the serving cell should be changed from the cell associated with the base station 110 to a neighbor cell).

As shown by reference number 960, the UE 120 may transmit subsequent uplink data on the CUR (e.g., based at least in part on receiving scheduling information in the USS indicating to transmit the subsequent uplink data on the CUR). In some aspects, the subsequent uplink data on the CUR may be associated with a different serving cell (e.g., may be transmitted to a different base station 110). For example, by performing the cell reselection procedure, a handover procedure may be initiated to handover the UE 120 from a current serving cell (e.g., associated with the base station 110) to a new serving cell (e.g., a neighbor cell associated with a different base station 110). In some aspects, the subsequent uplink data on the CUR may be associated with a same serving cell (e.g., may be transmitted to the base station 110) and a handover procedure may be initiated to hand over the UE 120 from a current serving cell to a new serving cell after the transmission of the subsequent uplink data.

As a result, the UE 120 may be enabled to perform cell reselection procedures during small data transmission in an inactive mode, thereby improving mobility of the UE, improving reliability of communications, and/or the like. Additionally, the UE 120 may be configured with measurement gaps such that scheduling information transmitted in the USS during small data transmission in an inactive mode is not missed by the UE 120 due to the UE 120 performing a measurement associated with a cell reselection procedure. This improves the reliability and reduces latency associated with the small data transmission in an inactive mode.

As indicated above, FIG. 9 is provided as an example. Other examples may differ from what is described with respect to FIG. 9.

Figure 10:
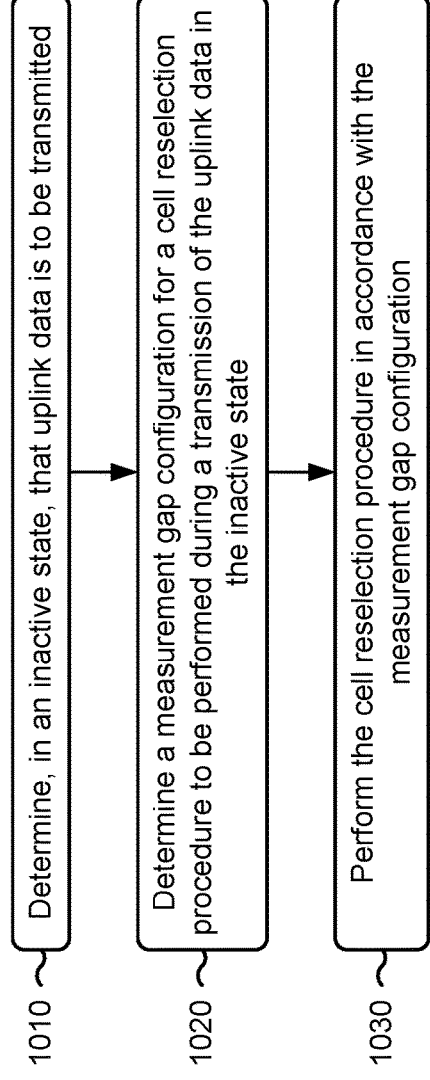
FIGS. 10 and 11 are diagrams illustrating example processes associated with measurement configuration during uplink data transfer over random access or dedicated uplink resources, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120) performs operations associated with measurement gap configuration during uplink data transfer over random access or dedicated uplink resources.

As shown in FIG. 10, in some aspects, process 1000 may include determining, in an inactive state, that uplink data is to be transmitted (block 1010). For example, the UE (e.g., using antenna 252, demodulator 254, MIMO detector 256, receive processor 258, transmit processor 264, TX MIMO processor 266, modulator 254, controller/processor 280, and/or memory 282) may determine, in an inactive state, that uplink data is to be transmitted, as described above.

As further shown in FIG. 10, in some aspects, process 1000 may include determining a measurement gap configuration for a cell reselection procedure to be performed during a transmission of the uplink data in the inactive state (block 1020). For example, the UE (e.g., using antenna 252, demodulator 254, MIMO detector 256, receive processor

258, transmit processor 264, TX MIMO processor 266, modulator 254, controller/processor 280, and/or memory 282) may determine a measurement gap configuration for a cell reselection procedure to be performed during a transmission of the uplink data in the inactive state, as described above.

As further shown in FIG. 10, in some aspects, process 1000 may include performing the cell reselection procedure in accordance with the measurement gap configuration (block 1030). For example, the UE (e.g., using antenna 252, demodulator 254, MIMO detector 256, receive processor 258, transmit processor 264, TX MIMO processor 266, modulator 254, controller/processor 280, and/or memory 282) may perform the cell reselection procedure in accordance with the measurement gap configuration, as described above.

Process 1000 may include additional aspects, such as any single aspect or any combination of aspects described below and/or in connection with one or more other processes described elsewhere herein.

In a first aspect, the cell reselection procedure comprises at least one of an intra-frequency cell reselection procedure, an inter-frequency cell reselection procedure, or an inter-RAT cell reselection procedure.

In a second aspect, alone or in combination with the first aspect, performing the cell reselection procedure in accordance with the measurement gap configuration comprises determining one or more measurement gaps indicated by the measurement gap configuration, and performing one or more measurements, during the one or more measurement gaps, of one or more neighbor cells.

In a third aspect, alone or in combination with one or more of the first and second aspects, process 1000 includes transmitting a request for a configured uplink resource to be used to transmit the uplink data.

In a fourth aspect, alone or in combination with one or more of the first through third aspects, transmitting the request for the configured uplink resource comprises transmitting the request for the configured uplink resource via an uplink random access channel message or a preconfigured uplink resource.

In a fifth aspect, alone or in combination with one or more of the first through fourth aspects, the request for the configured uplink resource comprises at least one of a MAC-CE, an RRC parameter of an RRC resume request message, or an RRC message.

In a sixth aspect, alone or in combination with one or more of the first through fifth aspects, determining the measurement gap configuration for the cell reselection procedure comprises receiving the measurement gap configuration that is based at least in part on the request for the configured uplink resource.

In a seventh aspect, alone or in combination with one or more of the first through sixth aspects, performing the cell reselection procedure in accordance with the measurement gap configuration comprises determining one or more measurement gaps indicated by the measurement gap configuration, and performing one or more measurements, during the one or more measurement gaps, of one or more neighbor cells.

In an eighth aspect, alone or in combination with one or more of the first through seventh aspects, the request for the configured uplink resource indicates that the configured uplink resource is to include multiple uplink resources that are distributed in time, and the measurement gap configuration indicates one or more measurement gaps that are based at least in part on a periodicity associated with the multiple uplink resources.

In a ninth aspect, alone or in combination with one or more of the first through eighth aspects, the request for the configured uplink resource indicates a traffic pattern associated with the uplink data, and the measurement gap configuration is based at least in part on the traffic pattern associated with the uplink data.

In a tenth aspect, alone or in combination with one or more of the first through ninth aspects, receiving the measurement gap configuration is based at least in part on the request for the configured uplink resource indicating that the configured uplink resource is to include multiple uplink resources that are distributed in time.

In an eleventh aspect, alone or in combination with one or more of the first through tenth aspects, receiving the measurement gap configuration comprises receiving the measurement gap configuration via a downlink random access channel message or a downlink RRC message.

In a twelfth aspect, alone or in combination with one or more of the first through eleventh aspects, determining the measurement gap configuration for the cell reselection procedure comprises transmitting measurement gap requirement information associated with performing the cell reselection procedure, and receiving the measurement gap configuration that is based at least in part on the measurement gap requirement information.

In a thirteenth aspect, alone or in combination with one or more of the first through twelfth aspects, performing the cell reselection procedure in accordance with the measurement gap configuration comprises determining one or more measurement gaps indicated by the measurement gap configuration, and performing one or more measurements, during the one or more measurement gaps, of one or more neighbor cells.

In a fourteenth aspect, alone or in combination with one or more of the first through thirteenth aspects, transmitting the measurement gap requirement information comprises transmitting the measurement gap requirement information via an uplink random access channel message or a preconfigured uplink resource.

In a fifteenth aspect, alone or in combination with one or more of the first through fourteenth aspects, the measurement gap requirement information is contained in an RRC parameter of an RRC resume request message or an RRC message.

In a sixteenth aspect, alone or in combination with one or more of the first through fifteenth aspects, receiving the measurement gap configuration comprises receiving the measurement gap configuration via a downlink random access channel message or a downlink RRC message.

In a seventeenth aspect, alone or in combination with one or more of the first through sixteenth aspects, determining the measurement gap configuration for the cell reselection procedure comprises determining one or more autonomous measurement gaps associated with performing the cell reselection procedure.

In an eighteenth aspect, alone or in combination with one or more of the first through seventeenth aspects, performing the cell reselection procedure in accordance with the measurement gap configuration comprises performing a measurement of one or more neighbor cells during the one or more autonomous measurement gaps.

In a nineteenth aspect, alone or in combination with one or more of the first through eighteenth aspects, determining the one or more autonomous measurement gaps comprises determining the one or more autonomous measurement gaps based at least in part on a search space configuration for monitoring a control channel associated with the transmission of the uplink data in the inactive state.

In a twentieth aspect, alone or in combination with one or more of the first through nineteenth aspects, determining the measurement gap configuration for the cell reselection procedure comprises determining that the UE is not required to perform measurements of one or more neighbor cells during the transmission of the uplink data in the inactive state.

In a twenty-first aspect, alone or in combination with one or more of the first through twentieth aspects, determining the measurement gap configuration for the cell reselection procedure comprises determining one or more measurements of one or more neighbor cells performed prior to a transmission of the uplink data in the inactive state.

In a twenty-second aspect, alone or in combination with one or more of the first through twenty-first aspects, performing the cell reselection procedure in accordance with the measurement gap configuration comprises performing a cell reselection evaluation procedure, during the transmission of the uplink data in the inactive state, using the one or more measurements of the one or more neighbor cells performed prior to the transmission of the uplink data in the inactive state.

In a twenty-third aspect, alone or in combination with one or more of the first through twenty-second aspects, process 1000 includes transmitting, in the inactive state, the uplink data via an uplink random access channel message or a configured uplink resource.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
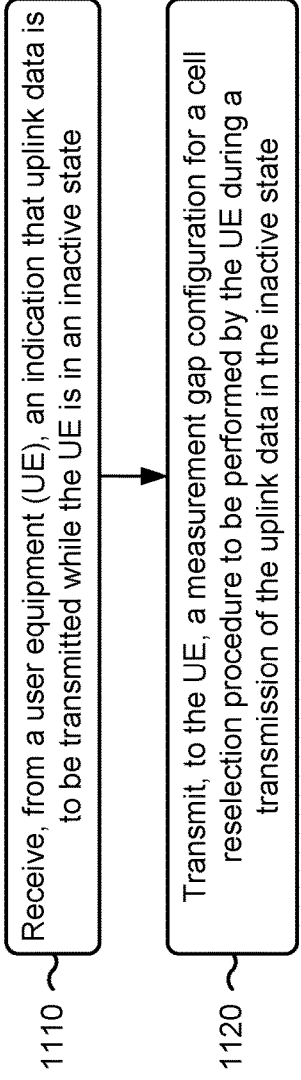

FIG. 11 is a diagram illustrating an example process 1100 performed, for example, by a base station, in accordance with various aspects of the present disclosure. Example process 1100 is an example where the base station (e.g., base station 110) performs operations associated with measurement gap configuration during uplink data transfer over random access or dedicated uplink resources.

As shown in FIG. 11, in some aspects, process 1100 may include receiving, from a UE, an indication that uplink data is to be transmitted while the UE is in an inactive state (block 1110). For example, the base station (e.g., using antenna 234, demodulator 232, MIMO detector 236, receive processor 238, controller/processor 240, and/or memory 242) may receive, from a UE, an indication that uplink data is to be transmitted while the UE is in an inactive state, as described above.

As further shown in FIG. 11, in some aspects, process 1100 may include transmitting, to the UE, a measurement gap configuration for a cell reselection procedure to be performed by the UE during a transmission of the uplink data in the inactive state (block 1120). For example, the base station (e.g., using transmit processor 220, TX MIMO processor 230, modulator 232, antenna 234, controller/processor 240, memory 242, and/or scheduler 246) may transmit, to the UE, a measurement gap configuration for a cell reselection procedure to be performed by the UE during a transmission of the uplink data in the inactive state, as described above.

Process 1100 may include additional aspects, such as any single aspect or any combination of aspects described below and/or in connection with one or more other processes described elsewhere herein.

In a first aspect, the cell reselection procedure comprises at least one of an intra-frequency cell reselection procedure, an inter-frequency cell reselection procedure, or an inter-radio access technology (inter-RAT) cell reselection procedure.

In a second aspect, alone or in combination with the first aspect, process 1100 includes receiving, from the UE, a request for a configured uplink resource to be used by the UE to transmit the uplink data.

In a third aspect, alone or in combination with one or more of the first and second aspects, receiving the request for the configured uplink resource comprises receiving, from the UE, the request for the configured uplink resource via an uplink random access channel message or a preconfigured uplink resource.

In a fourth aspect, alone or in combination with one or more of the first through third aspects, the request for the configured uplink resource comprises at least one of a MAC-CE, an RRC parameter of an RRC resume request message, or an RRC message.

In a fifth aspect, alone or in combination with one or more of the first through fourth aspects, transmitting the measurement gap configuration for the cell reselection procedure to be performed by the UE comprises transmitting, to the UE, the measurement gap configuration that is based at least in part on the request for the configured uplink resource.

In a sixth aspect, alone or in combination with one or more of the first through fifth aspects, process 1100 includes determining the measurement gap configuration based at least in part on the request for the configured uplink resource.

In a seventh aspect, alone or in combination with one or more of the first through sixth aspects, process 1100 includes determining that the request for the configured uplink resource indicates that the configured uplink resource is to include a single uplink resource, and determining that no measurement gaps are to be configured at the UE for the cell reselection procedure during a transmission of the uplink data.

In an eighth aspect, alone or in combination with one or more of the first through seventh aspects, process 1100 includes determining that the request for the configured uplink resource indicates that the configured uplink resource is to include multiple uplink resources that are distributed in time, and determining one or more measurement gaps that are based at least in part on a periodicity associated with the multiple uplink resources, and transmitting, to the UE, the measurement gap configuration indicating the one or more measurement gaps.

In a ninth aspect, alone or in combination with one or more of the first through eighth aspects, transmitting the measurement gap configuration is based at least in part on the request for the configured uplink resource indicating that the configured uplink resource is to include multiple uplink resources that are distributed in time.

In a tenth aspect, alone or in combination with one or more of the first through ninth aspects, transmitting the measurement gap configuration comprises transmitting the measurement gap configuration via a downlink random access channel message or a downlink RRC message.

In an eleventh aspect, alone or in combination with one or more of the first through tenth aspects, transmitting the measurement gap configuration for the cell reselection procedure to be performed by the UE comprises receiving, from the UE, measurement gap requirement information associated with performing the cell reselection procedure, and transmitting, to the UE, the measurement gap configuration that is based at least in part on the measurement gap requirement information.

In a twelfth aspect, alone or in combination with one or more of the first through eleventh aspects, process 1100 includes determining one or more measurement gaps for the UE based at least in part on the measurement gap requirement information, and transmitting the measurement gap configuration comprises transmitting the measurement gap configuration indicating the one or more measurement gaps.

In a thirteenth aspect, alone or in combination with one or more of the first through twelfth aspects, receiving the measurement gap requirement information comprises receiving, from the UE, the measurement gap requirement information via an uplink random access channel message or a preconfigured uplink resource.

In a fourteenth aspect, alone or in combination with one or more of the first through thirteenth aspects, the measurement gap requirement information is contained in an RRC parameter of an RRC resume request message or an RRC message.

In a fifteenth aspect, alone or in combination with one or more of the first through fourteenth aspects, transmitting the measurement gap configuration comprises transmitting the measurement gap configuration via a downlink random access channel message or a downlink RRC message.

In a sixteenth aspect, alone or in combination with one or more of the first through fifteenth aspects, transmitting the measurement gap configuration for the cell reselection procedure to be performed by the UE comprises determining that the UE is not required to perform measurements of one or more neighbor cells during the transmission of the uplink data in the inactive state, and transmitting the measurement gap configuration indicating that the UE is to use one or more measurements of one or more neighbor cells performed by the UE prior to a transmission of the uplink data in the inactive state for the cell reselection procedure.

In a seventeenth aspect, alone or in combination with one or more of the first through sixteenth aspects, process 1100 includes receiving, from the UE that is in the inactive state, the uplink data via an uplink random access channel message or a configured uplink resource.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
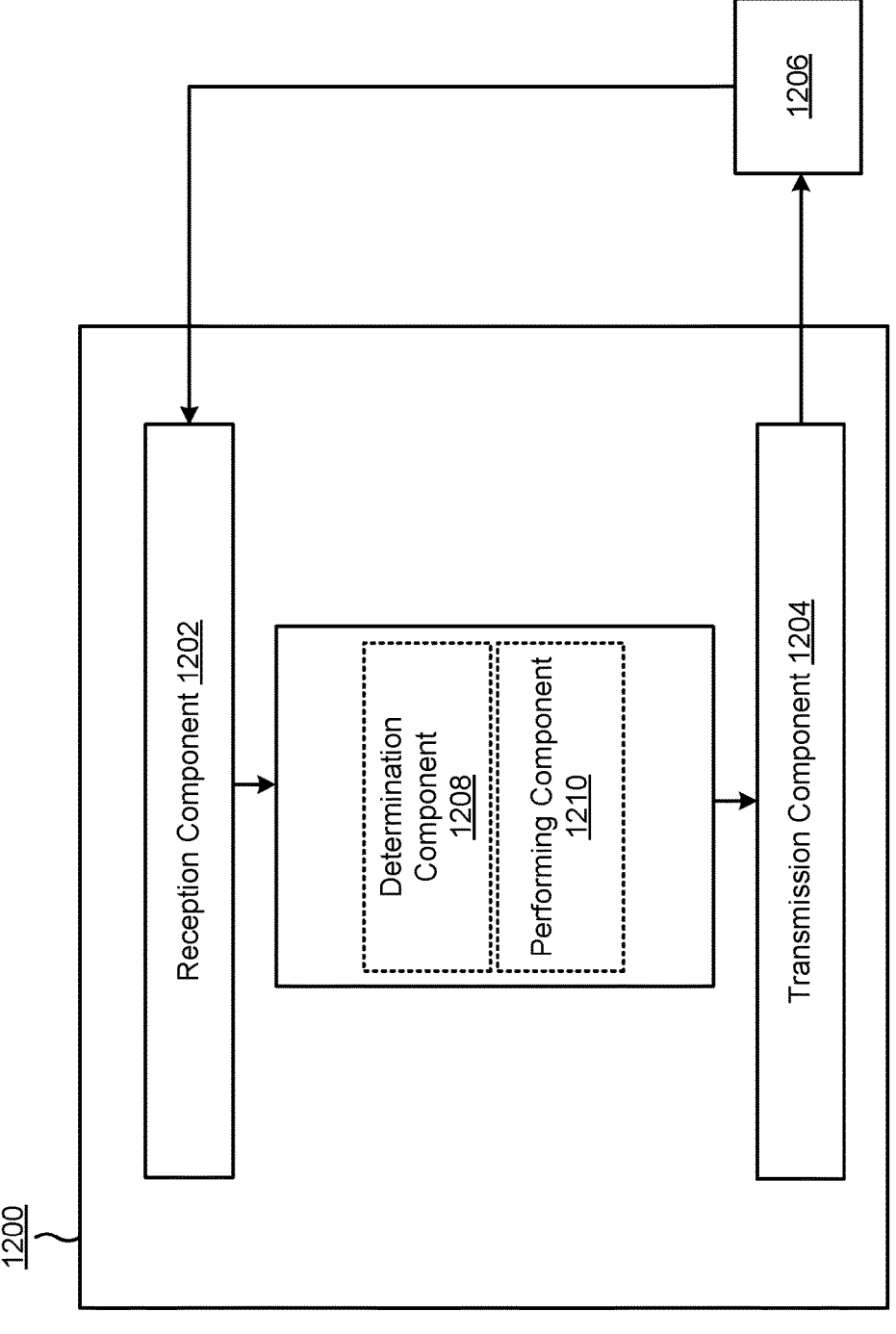
FIGS. 12 and 13 are block diagrams of example apparatuses for wireless communication, in accordance with various aspects of the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208, or a performing component 1210, among other examples.

In some aspects, the apparatus 1200 may be configured to perform one or more operations described herein in connection with FIG. 6-9. Additionally or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be collocated with the reception component 1202 in a transceiver.

The determination component 1208 may determine, in an inactive state, that uplink data is to be transmitted. In some aspects, the determination component 1208 may include a receive processor, a transmit MIMO processor, a transmit processor, a controller/processor, a memory, or a combination thereof, of the UE described above in connection with FIG. 2. The determination component 1208 may determine a measurement gap configuration for a cell reselection procedure to be performed during a transmission of the uplink data in the inactive state. The performing component 1210 may perform the cell reselection procedure in accordance with the measurement gap configuration. In some aspects, the performing component 1210 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
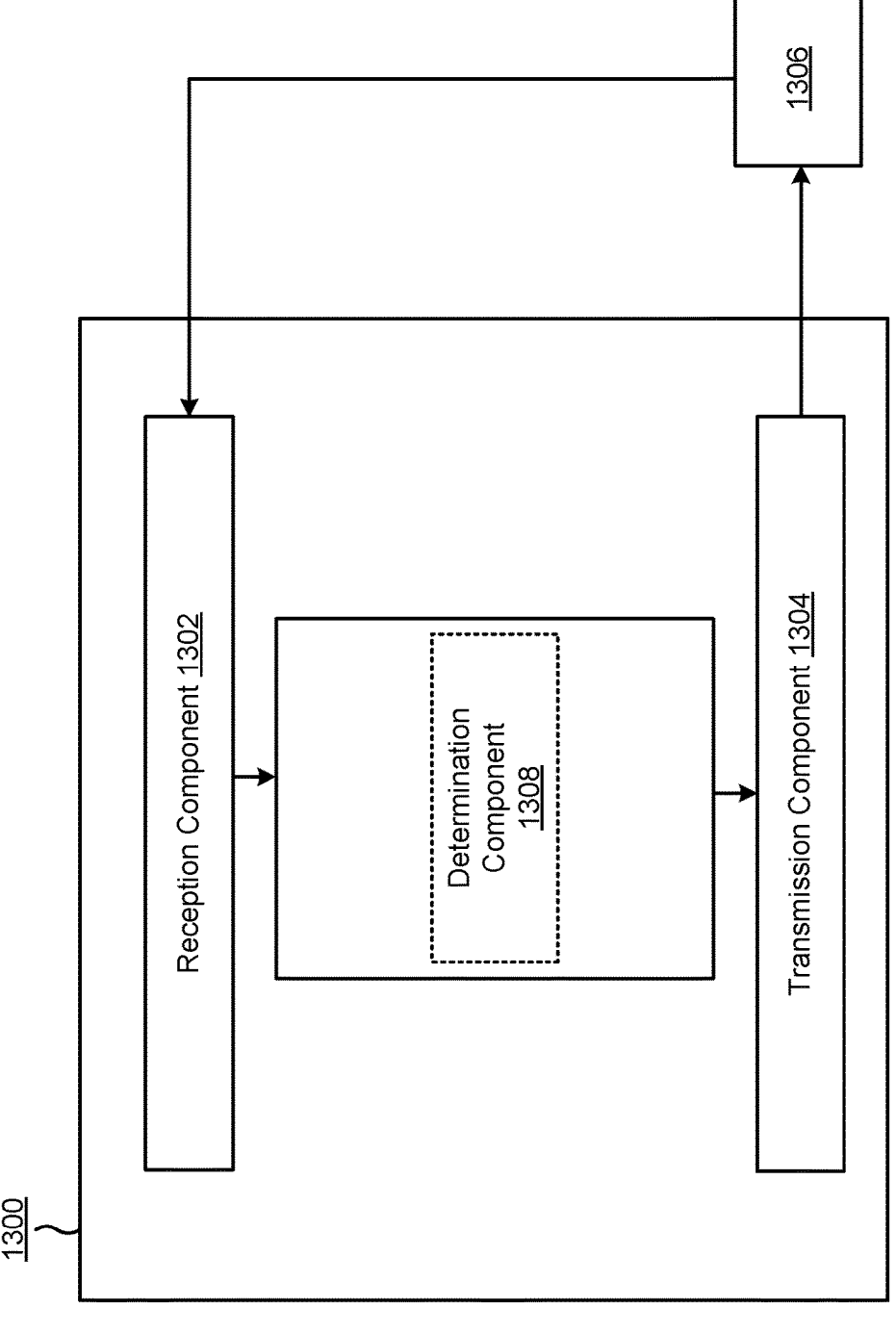

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a determination component 1308, among other examples.

In some aspects, the apparatus 1300 may be configured to perform one or more operations described herein in connection with FIGS. 6-9. Additionally or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be collocated with the reception component 1302 in a transceiver.

The reception component 1302 may receive, from a UE, an indication that uplink data is to be transmitted while the UE is in an inactive state. The transmission component 1304 may transmit, to the UE, a measurement gap configuration for a cell reselection procedure to be performed by the UE during a transmission of the uplink data in the inactive state. The determination component 1308 may determine the measurement gap configuration based at least in part on the request for the configured uplink resource. In some aspects, the determination component 1308 may include a receive processor, a transmit MIMO processor, a transmit processor, a controller/processor, a memory, or a combination thereof, of the base station described above in connection with FIG. 2.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, software, and/or a combination of hardware and software. As used herein, a "processor" is implemented in hardware, software, and/or a combination of hardware and software. "Software" is to be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, software, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   determining, in an inactive state, that uplink data is to be transmitted;
   transmitting, using an uplink random access channel (RACH) message, a configured uplink resource (CUR) request for a CUR to be used to transmit the uplink data, wherein the CUR request indicates measurement gap requirement information associated with performing a cell reselection procedure during a transmission of the uplink data in the inactive state;

determining, based at least in part on the CUR request, a measurement gap configuration for the cell reselection procedure to be performed during the transmission of the uplink data in the inactive state; and
   performing the cell reselection procedure in accordance with the measurement gap configuration.

2. The method of claim 1,
   wherein the cell reselection procedure comprises at least one of an intra-frequency cell reselection procedure, an inter-frequency cell reselection procedure, or an inter-radio access technology (inter-RAT) cell reselection procedure.

3. The method of claim 1,
   wherein performing the cell reselection procedure in accordance with the measurement gap configuration comprises:
      determining one or more measurement gaps indicated by the measurement gap configuration; and
      performing one or more measurements, during the one or more measurement gaps, of one or more neighbor cells.

4. The method of claim 1, further comprising:
   transmitting the CUR request for the CUR to be used to transmit the uplink data via the uplink RACH message or a preconfigured uplink resource.

5. The method of claim 4,
   wherein the CUR request comprises at least one of:
      a medium access control (MAC) control element,
      a radio resource control (RRC) parameter of an RRC resume request message, or
      an RRC message.

6. The method of claim 1,
   wherein determining the measurement gap configuration for the cell reselection procedure comprises:
      receiving, from a network entity, the measurement gap configuration that is based at least in part on the CUR request.

7. The method of claim 6,
   wherein performing the cell reselection procedure in accordance with the measurement gap configuration comprises:
      performing one or more measurements, during one or more measurement gaps indicated by the measurement gap configuration, of one or more neighbor cells.

8. The method of claim 1,
   wherein determining the measurement gap configuration for the cell reselection procedure comprises:
      receiving the measurement gap configuration that is based at least in part on the measurement gap requirement information.

9. The method of claim 8,
   wherein performing the cell reselection procedure in accordance with the measurement gap configuration comprises:
      performing one or more measurements, during one or more measurement gaps indicated by the measurement gap configuration, of one or more neighbor cells.

10. The method of claim 1,
   wherein determining the measurement gap configuration for the cell reselection procedure comprises:
      determining one or more autonomous measurement gaps associated with performing the cell reselection procedure.

11. The method of claim 1,
wherein determining the measurement gap configuration
for the cell reselection procedure comprises:
determining that the UE is not required to perform
measurements of one or more neighbor cells during
the transmission of the uplink data in the inactive
state.

12. The method of claim 11,
wherein determining the measurement gap configuration
for the cell reselection procedure comprises:
determining one or more measurements of one or more
neighbor cells performed prior to a transmission of
the uplink data in the inactive state.

13. The method of claim 12,
wherein performing the cell reselection procedure in
accordance with the measurement gap configuration
comprises:
performing a cell reselection evaluation procedure,
during the transmission of the uplink data in the
inactive state, using the one or more measurements
of the one or more neighbor cells performed prior to
the transmission of the uplink data in the inactive
state.

14. A method of wireless communication performed by a
network entity, comprising:
receiving an indication that uplink data is to be transmit-
ted while a user equipment (UE) is in an inactive state;
receiving, within an uplink random access channel
(RACH) message, a configured uplink resource (CUR)
request for a CUR to be used to transmit the uplink
data, wherein the CUR request indicates measurement
gap requirement information associated with perform-
ing a cell reselection procedure during a transmission
of the uplink data in the inactive state; and
transmitting, based at least in part on the CUR request, a
measurement gap configuration for the cell reselection
procedure to be performed by the UE during the
transmission of the uplink data in the inactive state.

15. The method of claim 14,
wherein transmitting the measurement gap configuration
for the cell reselection procedure to be performed by
the UE comprises:
determining that the UE is not required to perform
measurements of one or more neighbor cells during
the transmission of the uplink data in the inactive
state; and
transmitting the measurement gap configuration indi-
cating that the UE is to use one or more measure-
ments of one or more neighbor cells performed by
the UE prior to a transmission of the uplink data in
the inactive state for the cell reselection procedure.

16. The method of claim 14, further comprising:
receiving the uplink data, associated with the UE that is
in the inactive state, via the uplink RACH message or
a configured uplink resource.

17. A user equipment (UE) for wireless communication,
comprising:
a memory; and
one or more processors coupled to the memory, the
memory comprising instructions executable by the one
or more processors to cause the UE to:
determine, in an inactive state, that uplink data is to be
transmitted;
transmit, using an uplink random access channel
(RACH) message, a configured uplink resource
(CUR) request for a CUR to be used to transmit the
uplink data, wherein the CUR request indicates measurement gap requirement information associ-
ated with performing a cell reselection procedure
during a transmission of the uplink data in the
inactive state;
determine, based at least in part on the CUR request, a
measurement gap configuration for the cell reselec-
tion procedure to be performed during the transmis-
sion of the uplink data in the inactive state; and
perform the cell reselection procedure in accordance
with the measurement gap configuration.

18. The UE of claim 17,
wherein the instructions are further executable by the one
or more processors to cause the UE to:
transmit the CUR request for the CUR to be used to
transmit the uplink data via the uplink RACH mes-
sage or a preconfigured uplink resource.

19. The UE of claim 17,
wherein the instructions are further executable by the one
or more processors to cause the UE to:
receive the measurement gap configuration, wherein
the measurement gap configuration is based at least
in part on the measurement gap requirement infor-
mation.

20. The UE of claim 19,
wherein the instructions are further executable by the one
or more processors to cause the UE to:
perform one or more measurements, during one or
more measurement gaps indicated by the measure-
ment gap configuration, of one or more neighbor
cells.

21. The UE of claim 19,
wherein the instructions are further executable by the one
or more processors to cause the UE to:
transmit the measurement gap requirement information
via the uplink RACH message or a preconfigured
uplink resource.

22. The UE of claim 17,
wherein the instructions are further executable by the one
or more processors to cause the UE to:
perform a measurement of one or more neighbor cells
during one or more autonomous measurement gaps
associated with performing the cell reselection pro-
cedure.

23. The UE of claim 22,
wherein the one or more autonomous measurement gaps
are based at least in part on a search space configuration
for monitoring a control channel associated with the
transmission of the uplink data in the inactive state.

24. The UE of claim 17,
wherein the instructions are further executable by the one
or more processors to cause the UE to:
determine that the UE is not required to perform
measurements of one or more neighbor cells during
the transmission of the uplink data in the inactive
state.

25. The UE of claim 24,
wherein the instructions are further executable by the one
or more processors to cause the UE to:
determine one or more measurements of one or more
neighbor cells performed prior to a transmission of
the uplink data in the inactive state.

26. The UE of claim 25,
wherein the instructions are further executable by the one
or more processors to cause the UE to:
perform a cell reselection evaluation procedure, during
the transmission of the uplink data in the inactive
state, using the one or more measurements of the one or more neighbor cells performed prior to the transmission of the uplink data in the inactive state.

27. A network entity for wireless communication, comprising:

a memory; and one or more processors coupled to the memory, the memory comprising instructions executable by the one or more processors to cause the network entity to:

receive an indication that uplink data, associated with a user equipment (UE), is to be transmitted while the UE is in an inactive state;

receive, within an uplink random access channel (RACH) message, a configured uplink resource (CUR) request for a CUR to be used to transmit the uplink data, wherein the CUR request indicates measurement gap requirement information associated with performing a cell reselection procedure during a transmission of the uplink data in the inactive state; and transmit, based at least in part on the request for the configured uplink resource, a measurement gap configuration, associated with the UE, for the cell reselection procedure to be performed by the UE during the transmission of the uplink data in the inactive state.

28. The network entity of claim 27, wherein the cell reselection procedure comprises at least one of an intra-frequency cell reselection procedure, an inter-frequency cell reselection procedure, or an inter-radio access technology (inter-RAT) cell reselection procedure.

29. The network entity of claim 27, wherein the instructions are further executable by the one or more processors to cause the network entity to:

receive the CUR request for the CUR to be used by the UE to transmit the uplink data via the uplink RACH message or a preconfigured uplink resource.

* * * * *